March 11, 1947.  F. M. JONES  2,417,253
TWO CYCLE GAS ENGINE
Filed April 17, 1944  3 Sheets-Sheet 3
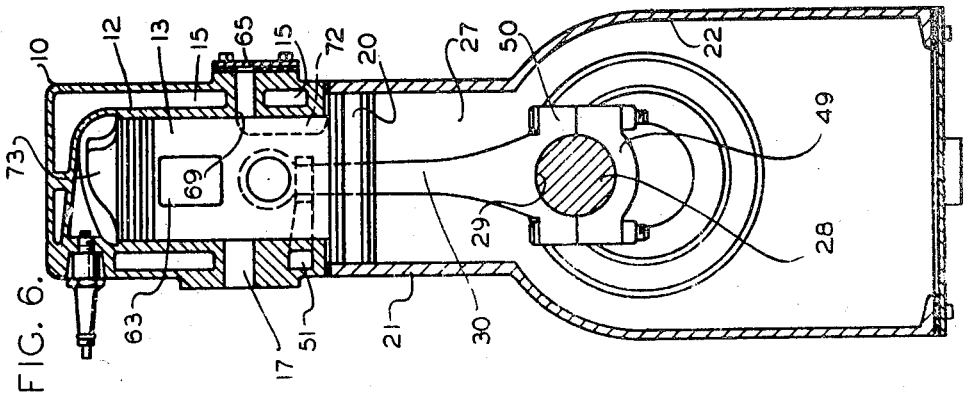
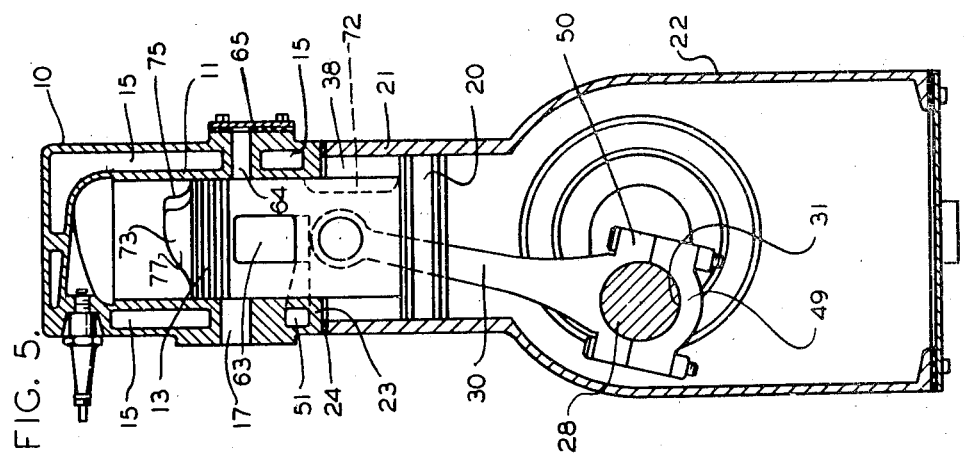
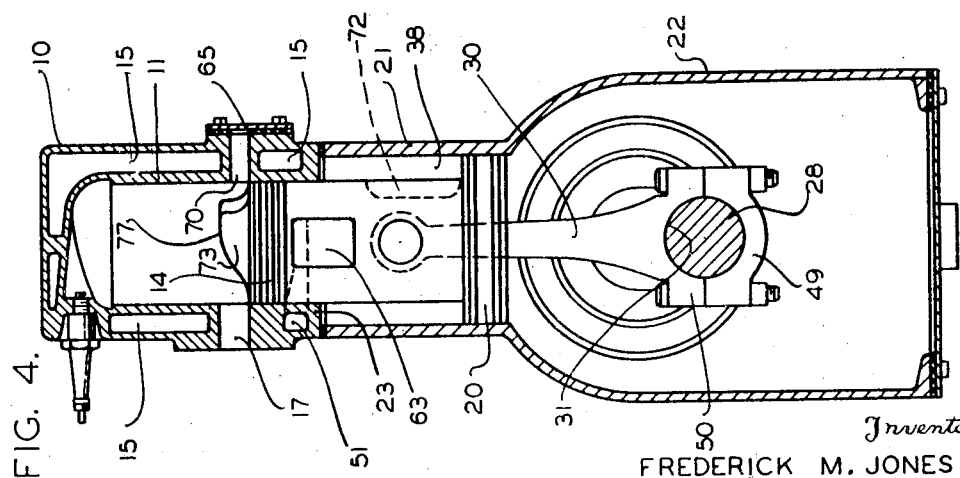
Inventor
FREDERICK M. JONES
By P. A. Whiteley
Attorney Patented Mar. 11, 1947

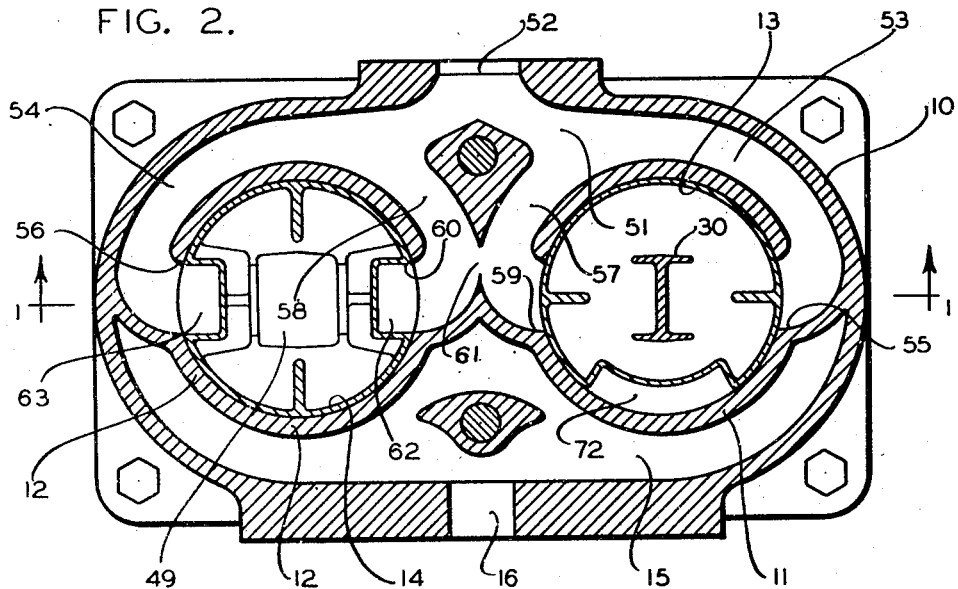

2,417,253

UNITED STATES PATENT OFFICE 2,417,253

TWO-CYCLE GAS ENGINE

Frederick M. Jones, Minneapolis, Minn., assignor to U. S. Thermo Control Co., Minneapolis, Minn., a corporation of Minnesota Application April 17, 1944, Serial No. 531,449

7 Claims. (Cl. 123—59)

My invention relates to two-cycle gas engines and has for its purpose to provide a multi-cylinder two-cycle gas engine which is valveless and wherein all of the gas and exhaust control passages as well as the inlet and gas control passages are in effect unitary gas chambers which serve both cylinders and are operative alternately for controlling inlet and exhaust to and from one or the other of said cylinders.

For a great many years efforts have been made to develop a two-cycle gas engine wherein the firing or outward stroke of the piston will simultaneously generate power and load a chamber with gas mixture while at the same time the upward or compression stroke of the gas cylinder will compress the charge in another chamber and finally cause the compressed charge to flow into the other cylinder above the piston at its point of outer movement. These operations in the past have been controlled by a combination of valves, cross passages from one cylinder to another and the movements of the piston itself successively opening such passages. All of these efforts in the past have resulted in practical failure. That is, in no case has a successful two-cycle gas engine of this type been provided of sufficient certainty of operation and efficiency to be industrially marketable and useable.

After prolonged study of this form of gas engine in an effort to determine the reasons for failure, I have discovered that the causes of this failure are due to a number of factors of difficulty involving problems not heretofore solved. These factors include an improper arrangement of gas flow passages relative to the inlet and exhaust to and from the cylinders and to the means whereby these passages are caused alternately to connect first with one cylinder and then with the other, to the fact that the gas control passages have uniformly been too small and with too many twists and turns resulting in frictional losses of the rapidly moving gas in a speeding engine, and to the fact that the compression chamber for inlet gas mixture has been too small and the degree of compression of the gas mixture has not been great enough to effect certain and satisfactory charging of the explosion cylinder before compression of the gas therein.

These discoveries were made only after prolonged study and extensive and costly experimentation, and have resulted in a two cycle gas engine of the general type above defined which has a very high degree of efficiency in operation and great economy in the combustion of gas for the production of the power produced.

It is therefore a principal object of my invention to provide a two cycle gas engine wherein two cylinders or multiples thereof are successively charged with gas mixture from a compression chamber in the other cylinder and wherein no separate valves as such are employed.

It is a further object of my invention to provide a single chamber having unvalved connection with a source of supply of explosive gas mixture and to have this chamber expanded into inter-connecting passageways communicating in a common plane with openings or ports at the sides of the explosion cylinder, there being preferably two such ports in diametrically opposite positions opening into the explosion cylinder.

It is a further object of my invention to provide a gas compression cylinder below the explosion cylinder with an annular chamber about the explosion piston and to form recesses in the sides of the pistons adapted simultaneously to open communication between the charging ports into the explosion cylinders and the annular compression chambers, these recesses being so positioned relative to the movement of the pistons that the above noted communication is effected alternately for one annular chamber and then the other, the charging being effected always through the single chamber and inter-connected passageways.

It is a further object of my invention, in the above noted combination, to operate the pistons as substitutes for independent valves so that the pistons themselves have the effect of alternately opening and closing gas charging communication from the gas supplying chamber to the respective gas charging chambers.

It is a further object of my invention to provide a single charging chamber or passageway connected at its ends through large ports with both cylinders and to form an elongated recess in the pistons so positioned relatively to the charging passageway and to the annular chambers in which the gas is compressed that at the end of the compression stroke of the piston the compressed charge of explosive gas mixture of one of the pistons will be released to the common passageway to be forced through that chamber or passageway into the other cylinder at the end of the explosion stroke of its piston.

It is a further object of my invention to form the aforesaid passageway or the openings or ports leading therefrom into the cylinders of relatively large cross sectional area to give ready and free passage of the compressed explosive gases through the common chamber or passageway and into the other cylinder.

It is a further object of my invention to provide an exhaust passageway in the cylinders directly opposite the inlet ports from the common inlet passageway and to make this exhaust port of relatively very large cross-sectional area whereby the movement of exhaust gases from the cylinder at the end of the explosion stroke may clear the cylinder of said exhaust gases in the quickest possible time.

It is a further object of my invention to have the bottom of the inlet ports and the exhaust ports of each cylinder in a common plane which passes through the plane of the top outer limits of the piston at the end of the explosion stroke, and to make the inlet opening narrower than the outlet opening, so that exhaust will begin before inlet and the first part of the compression stroke will continue to force out gas, thus insuring a thorough scavenging of the cylinder.

It is a further object of my invention to provide a baffle on the end of the piston to be presented to the inlet port at the end of the explosion stroke, said baffle presenting a double curved face to the inlet port and a long sloping face to the exhaust port, whereby there is effected a movement of the inlet gases in the cylinder in relation to the very quick movement of the exhaust gases out of the cylinder that certainly and effectively scavenges the explosion cylinder and permits filling of the same with explosive gas mixture with substantially no wastage thereof.

It is a further and most important object of my invention to so combine, relate and proportion the sizes of the instrumentalities severally recited in the above objects of the invention as to produce a thoroughly synchronous and efficient operation of the two-cycle engine whereby certain and effective operation is effected together with production of large power for the gas consumed.

The full objects and advantages of my invention will now be pointed out in connection with the appended specification, and the novel features thereof which produce the aforesaid highly advantageous results will be particularly pointed out in the claims.

In the drawings illustrating an application of my invention in one form:

Fig. 2 is a sectional plan view taken on line 2—2 of Fig. 1 and produced on an enlarged scale.

Fig. 3 is a sectional plan view taken on substantially line 3—3 of Fig. 1.

Fig. 4 is a section taken through one of the cylinders at right angles to the crankshaft and rod pin and hence at right angles to the sectional showing of Fig. 1, showing the piston at the end of the outward or explosion stroke.

Fig. 5 is a similar sectional view showing the piston traveling up the compression stroke.

Fig. 6 is a view similar to Fig. 4 with the piston in the position of having completed its compression stroke and showing the manner in which the gas compressed in the annular compression chamber is transferred to the other cylinder of the two working together.

Figure 1:
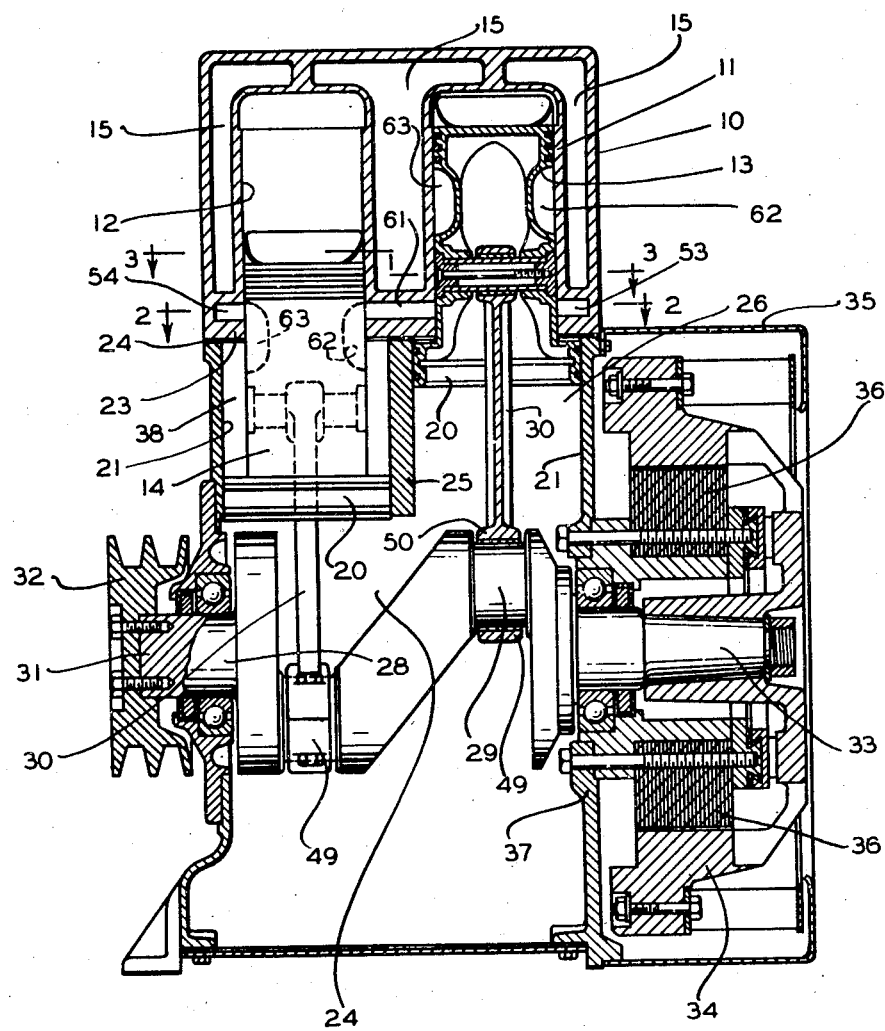
Fig. 1 is a cross-sectional elevation view of the two-cycle engine with a special type generator attached thereto.

As illustrated, a main head block casting 10 contains the two cylinders 11 and 12 in which operate the two pistons 13 and 14. The head casting also has formed therein a series of closed passages. There are inter-connected water chambers 15 for the water cooling system, one of which is provided with a pump connection opening 16, Fig. 2. There also are provided exhaust passages 17 and 18 which as clearly shown in Fig. 3 are very wide and as shown in Fig. 4 are quite deep, thus giving a large cross-sectional area of the exhaust flow permitting exceedingly rapid exhaust. Ribs 19 extend across the exhaust port into the cylinders to give sufficient strength to the cylinders at this point and to restrain the piston rings in operation.

The piston 13 has attached thereto an extended piston portion 20 of considerably larger diameter than the diameter of piston 13. This enlarged diameter piston 20 operates in a cylinder 21 which may, as shown in Figs. 1 and 4, be directly attached to the crank case casting 22 and which is suitably united with the lower thickened base 23 of the head casting 10 and sealed by a gasket 24.

The casing 22, as shown in Fig. 1, encloses the crank chamber 24 of both pistons 13 and 14. A central skirt 25, Fig. 1, completes the cylinders 21 and forms together with the other walls thereof cylinder chambers 26 and 27 in which the enlarged pistons 20 operate.

A double crankshaft 28 of usual construction extends across the chamber 24 and has applied to its bearings 29 piston rods 30 of generally usual construction.

A modified form of piston pin is employed, as clearly shown in Fig. 3. In this form the rod head 39 and interior babbitt 40 surround a sleeve 41 rather than the customary pin. Heads 42 and 43 are countersunk in the piston wall within tubular extensions 44 and 45, which receive therein the ends of sleeve 41 surrounding extensions 46 and 47 of the countersunk heads 42 which are held together in position on the cylinder wall by means of a screw 48. Thus the tubular bearing pin 41 is relatively light and mounted to be easily replaced. Piston rods 30 are secured to the crank throw bearings 29 by means of the customary divided heads 49 and 50 secured together in the usual way.

Upon an extended end 31 of the crankshaft 28 is mounted the drive pulley 32. Upon an opposite extension 33 of crankshaft 28 is mounted the rotor 34 of a starter generator encased in a housing 35 secured to the side of casting 22. The rotor 34 is held to rotate about the fixed coils 36 carried upon the wall 37 of the crank casing 22. There are novel features of this starter generator which will be disclosed in detail and claimed in another application later to be filed.

As clearly shown in Figs. 1 and 4, when a piston 13 or 14 has reached the end of the explosion stroke there will be an annular chamber 38 formed between the inner walls of cylinder 21 and the outer walls of a piston 13 or 14. This annular chamber is adapted to receive explosive gas mixture by means hereinafter described, as the pistons move outwardly on their explosion stroke while the gas going into chamber 38 will be compressed in the annular chamber 38 at the same time that the gas is compressed within the power cylinders 11 and 12 when the piston is moved in reverse direction to its full compression position, as shown progressively in Figs. 4, 5, and 6.

The use of such a compound piston to draw in explosive gas mixture upon the outward stroke and to compress it upon the inward stroke, together with means of causing the compressed explosive mixture to be forced into the opposite cylinder at the end of the compression stroke is well known. My invention relates to the particular means of effecting the transfer of compressed explosive mixture to the chamber of the opposite cylinder in combination with the form and position of passageways and also their size, and with the form of the piston itself making possible a quick and free movement both of the gases of combustion into the charging chamber and from the charging chamber to the power cylinder and of the burned gases in exhaust.

In addition to the exhaust passages 17, heretofore referred to, the cylinders have formed therein a gas mixture inlet passageway 51 which has in general the cross-sectional area indicated in Figs. 4, 5, and 6 and has the plan characteristics indicated in Fig. 2. As there shown, this passageway connects at 52 with the gas mixture conduit running from the carburetor (not shown) and has branch passageways 53 and 54 which open through ports 55 and 56 through the walls of cylinders 11 and 12. There are other branch passageways 57 and 58 which open through other ports 59 and 60 extending through the walls of cylinders 11 and 12 at diametrically opposite points of the cylinder wall.

The branch passageways 57 and 58, in relation to the ports 59 and 60, form in effect a single passageway connecting the two cylinders, as indicated at 61 in Fig. 1, which is a sectional view taken on substantially the line 1—1 of Fig. 2. It will thus be apparent, as clearly indicated in Fig. 1, that the respective ports 55 and 56, and 59 and 60 are at all times covered by the elongated power pistons 13 and 14. But these pistons have formed therein at opposite sides thereof, indented chamber pockets 62 and 63, shown in section at the right of Fig. 1 and indicated in dotted lines at the left. These pockets are also shown in transverse cross-section in the left hand sectional view of piston 14 on Fig. 2.

Now, referring to Fig. 1, it will be noted that piston 14 is at the end of its outer or explosion stroke, while piston 13 is at the end of its inner or compression stroke. In this position the pockets 62 and 63 of piston 14 have come opposite the diametrically opposed ports 56 and 60 through cylinder 12, while the pockets 62 and 63 of piston 13 are blocked by the wall of cylinder 11. It will be apparent that in the outward stroke of piston 14 taking it to the position shown in Fig. 1, for a part of that stroke a vacuum will have been formed in the annular chamber 38 so that when the pocket passageways 62 and 63 come to a position where they open at the same time into ports 56 and 60 and into annular chamber 38, the explosive mixture from the carburetor will be drawn into the chamber 38.

The relatively large area of the passages, see Fig. 2, and the fact that there are two of such passages makes possible the transfer of gas mixture very easily with requisite speed no matter how fast the engine may be speeding. It is this arrangement, taken in connection with the means of charging the explosion cylinder, which results in that quick and certain charging of the annular compression chamber that produces, I verily believe for the first time, a practically operative two-cycle engine of this type.

Referring particularly to Figs. 3 and 4, the means of charging the explosion cylinder is illustrated. This comprises a passageway or chamber 64 formed in the head block 10, of a cross-sectional dimension indicated in Figs. 4, 5, and 6 and of a plan dimension indicated in Fig. 3. It will be noted that for manufacturing reasons this chamber is not entirely within the head casting but is closed by a plate 65 and gaskets 66, as clearly shown in Fig. 3. The passageway or chamber 64, it will be noted, is quite wide and is provided with wide extensions 67 and 68 which open through large ports 69 and 70 into the respective cylinders 13 and 14. That is, there is only a single chamber and passageway which serves to charge both explosion cylinders. Since these ports are quite wide reinforcing ring-guide ribs 71 extend across the ports 69 and 70.

As shown in section lines in Figs. 2 and 3 and in dotted lines in Figs. 4, 5, and 6, the pistons 13 and 14 are provided with chamber pockets 72. The pockets 72 are formed in a position generally at right angles to the position of pockets 62 and 63, and are both wider and longer, being of a length to bridge the distance between the chamber 64 and the upper end of the annular chamber 38. An inspection of Figs. 4, 5, and 6, referred to Fig. 3, shows how this bridging is effected.

Thus in Fig. 5 is shown the balanced position of the pistons at the center of their respective outer or explosion and inner or compression strokes, in which positions the outlets from chamber 64 to both cylinders are blocked by both pistons 13 and 14. As shown in Fig. 4 the outlet or port 70 through cylinder 11 has been opened above piston 14 while at the same time, viewing Fig. 6, the pocket 72 has opened communication between the outlet or port 69 through cylinder 13, thus permitting the compressed gas mixture in annular chamber 38 to flow through the pocket 72 therefrom and through the common passageway 64 to the port 70 and into cylinder 12.

It will be apparent that owing to the high degree of compression of gas mixture in annular chamber 38 and the large area of passage through pocket chamber 72 and the chamber 64 and its branch 68, the charging mixture will move at great speed toward the end of the explosion stroke and after the beginning of exhaust.

I have devised a form of baffle on the ends of the pistons, indicated at 73, which I have found particularly effective to direct the explosive gas mixture into the explosion cylinder. This baffle is shown in sectional plan in Fig. 3. It comprises a curved front wall 74, curved end walls 75 and 76 and a long top wall 77 which slopes down to the plane of the top of the piston proper at the region of the junction thereof with the exhaust ports 17 and 18. The combined effect of this arrangement of baffle with respect to the exhaust port 17 and inlet port 70, see Fig. 4, the exhaust port being wide enough to partly open before the inlet port opens, produces a remarkably efficient exhaust and scavenging of the explosion cylinder without wastage of explosive gas mixture.

The advantages of my invention have been quite clearly outlined in the preceding specification. The essential advantage must be referred to in terms of performance. Extensive tests of the two-cycle gas engine of this application have demonstrated a very exceptional efficiency in operation, which is so marked as to be quite outside what should be and was expected of it. This advantageous result may be expressed in terms of performance, as high power development in proportion to the weight of metal, size of cylinders, and the like; complete reliability with continuous flow of explosion power strokes having the smoothness of operation of more complicated gas engines such as six cylinder and eight cylinder engines, and great economy of gas consumption in proportion to the power produced.

I claim:

1. In a two-cycle gas engine having a pair of cylinders and pistons operative alternately in opposite directions therein, means for supplying explosive mixture successively and alternately to the cylinders above the pistons, including a common passageway which is wide and shallow and of large cross-sectional area, which terminates in ports extending through the walls of the cylinders, said ports being of large cross-sectional area, said passageway having a short arc-like extent between said ports, the walls of the respective pistons being so formed as to admit explosive mixture to the passageway when the piston is near the end of its inward stroke and to open the port of the other end of the passageway to the interior of the other cylinder when the piston therein is near the end of its outward stroke.

2. In a two-cycle gas engine having a pair of cylinders and pistons operative alternately in opposite directions therein, means for supplying explosive mixture successively and alternately to the cylinders above the pistons, including a common passageway which is wide and shallow and of large cross-sectional area and which terminates in ports extending through the walls of the cylinders, said ports being of large cross-sectional area, and exhaust passageways from the respective cylinders directly opposite the inlet ports, said exhaust ports each being of very large cross-sectional area, each of the pistons comprising a baffle having a face presented to the inlet port which is continuously curved in a direction transverse to the piston and which is curved outwardly and upwardly in the direction of the line of movement of the piston, whereby the inlet gases are directed laterally and upwardly to follow the exhaust gases and aid in scavenging the cylinder.

3. In a two-cycle gas engine having a pair of cylinders and pistons operative alternately in opposite directions therein, means for supplying explosive mixture successively and alternately to the cylinders above the pistons, including a common passageway which is wide and shallow and of large cross-sectional area and which terminates in ports extending through the walls of the cylinders, said ports being of large cross-sectional area, and exhaust passageways from the respective cylinders directly opposite the inlet ports, said exhaust ports each being of very large cross-sectional area, each of the pistons comprising a baffle having a face presented to the inlet port which is continuously curved in a direction transverse to the piston and which is curved outwardly and upwardly in the direction of the line of movement of the piston, and having a face presented to the exhaust port which is curved toward the exhaust port and downwardly, whereby the inlet gases are directed laterally and upwardly and then downwardly to follow the exhaust gases and aid in scavenging the cylinder.

4. A unitary two-cycle two-cylinder gas engine, comprising a unitary engine casing and a pair of cylinders formed thereby, a piston in each cylinder, said pistons operative alternately in opposite directions therein, an enlarged section of each cylinder and of each piston forming conjointly a separate charging chamber for each piston, an independent gas inlet passageway in the casing common to and having its ends ported into both cylinders along common horizontal planes, said ports being opened and closed in alternation by the successive inward and outward strokes of the pistons and being of large cross-sectional area for free flow of inlet gas into the respective charging chambers, and a passageway formed in each piston and so positioned that toward the end of an inward stroke of the piston when its charging chamber has been expanded to nearly its full size it will open the port from said common chamber to effect introduction of inlet gas in said last named piston.

5. A unitary two-cycle two-cylinder gas engine, comprising a unitary engine casing and a pair of cylinders formed thereby, a piston in each cylinder, said pistons operative alternately in opposite directions therein, an enlarged section of each cylinder and of each piston forming conjointly a separate charging chamber for each piston, an independent gas inlet passageway in the casing common to both cylinders and having branches extending to opposite sides of each cylinder and ported thereinto at the ends of each of said branches, said pairs of ports being opened and closed in alternation by the successive inward and outward strokes of the pistons and being of large cross-sectional area to accommodate rapid free flow of inlet gas into the respective charging chambers, and a pair of passageways formed in each piston in vertical alignment with said port openings and positioned on the pistons so that toward the end of an inward stroke of the piston when its charging chamber has been expanded to nearly its full size said piston passageways will simultaneously open the ports from said common gas inlet passageway to effect introduction of inlet gas at the end of the inward stroke of first one piston and then the other piston in continuous alternation.

6. A unitary two-cycle two-cylinder gas engine, comprising a unitary engine casing and a pair of cylinders formed thereby, a piston in each cylinder, said pistons operative alternately in opposite directions therein, a separate charging chamber associated with each of the pistons, means including a passageway indented in the wall of each piston for successively and in alternation conducting a charge of gas from said charging chamber into the respective cylinders, said means including a direct common passageway in the casing extending in a horizontal plane from one cylinder to the other and being of large cross-sectional area, said passageway being ported at its ends into the interior of both cylinders and closed and opened by the pistons therein successively to channel compressed gas from the charging chamber and the indented passageway of one cylinder as inlet gas into the other cylinder.

7. A unitary two-cycle two-cylinder gas engine, comprising a unitary engine casing and a pair of cylinders formed thereby, a piston in each cylinder, said pistons operated alternately in opposite directions therein, a separate charging chamber associated with each of the pistons, two independent passageways positioned one above the other and extending horizontally and having their respective ends ported into both cylinders, said respective passageways and ports being of large cross-sectional area, the lower of said horizontal passageways controlling flow of inlet gas to the charging chambers and the upper of said horizontal passageways controlling flow of explosive mixture to the cylinders, and separate passageways formed in each piston, one thereof being positioned to cooperate with the port from the inlet common passageway to control flow of inlet gas to the charging chamber and the other of said piston passageways being positioned to cooperate with the port to the upper chamber for controlling flow of gas mixture to the respective cylinders, the respective ports being opened and closed in alternation by the successive inward and outward strokes of the pistons, said piston passageways being so positioned in the respective cylinders that it opens the inlet gas passageway to the charging chamber toward the end of the inward stroke of one piston while simultaneously the piston chamber of the other piston opens to the common chamber to deliver gas mixture to the other cylinder.

FREDERICK M. JONES.

REFERENCES CITED

The following references are of record in the file of this patent:

UNITED STATES PATENTS

| Number | Name | Date |
|---|---|---|
| 1,246,276 | Juengst | Nov. 13, 1917 |
| 1,092,109 | Kempton | Mar. 31, 1914 |
| 1,376,800 | Deisch | May 3, 1921 |
| 1,208,805 | Lonaberger et al. | Dec. 19, 1916 |
| 1,450,081 | Henroid et al. | Mar. 27, 1923 |
| 1,051,537 | Appleton | Mar. 28, 1913 |
| 1,907,354 | Hansen | May 2, 1933 |